United States Patent [19]

Hay

[11] 4,028,341

[45] June 7, 1977

[54] PROCESS FOR THE PREPARATION OF POLYPHENYLENE OXIDES WITH HYDROLYTICALLY STABLE COPPER CATALYSTS

[75] Inventor: Allan S. Hay, Schenectady, N.Y.

[73] Assignee: General Electric Company, Schenectady, N.Y.

[22] Filed: Jan. 13, 1975

[21] Appl. No.: 540,473

Related U.S. Application Data

[63] Continuation-in-part of Ser. No. 441,295, Feb. 11, 1974, abandoned.

[52] U.S. Cl. .......................................... 260/47 ET
[51] Int. Cl.$^2$ ........................................ C08G 65/44
[58] Field of Search ................................. 260/47 ET

[56] References Cited

UNITED STATES PATENTS

| | | | |
|---|---|---|---|
| 3,306,874 | 2/1967 | Hay | 260/47 ET |
| 3,306,875 | 2/1967 | Hay | 260/47 ET |
| 3,838,102 | 9/1974 | Bennett et al. | 260/47 ET |
| 3,900,445 | 8/1975 | Cooper et al. | 260/47 ET |

*Primary Examiner*—Howard E. Schain
*Attorney, Agent, or Firm*—F. Wesley Turner; Joseph T. Cohen; Jerome C. Squillaro

[57] ABSTRACT

An improved process for the preparation of high molecular weight polyphenylene oxides by oxidatively coupling a di-ortho-substituted phenol with an oxygen-containing gas under polymer-forming reaction conditions in a liquid reaction system is provided by using a specific copper-amine complex soluble in the reaction mixture comprising copper ion, bromide ion, a specific class of hindered secondary diamines and a specific group of tertiary monoamines. The process is characterized by a reaction system which (1) results in the formation of higher molecular weight polymer in a given reaction time or polymer of comparable molecular weight in substantially decreased reaction time, (2) permits the use of extremely low copper-to-phenol ratio, and (3) permits the reaction to be carried out in a solvent system where the water of reaction forms a separate phase without the necessity of removing the water phase.

23 Claims, No Drawings

PROCESS FOR THE PREPARATION OF POLYPHENYLENE OXIDES WITH HYDROLYTICALLY STABLE COPPER CATALYSTS

This application is a continuation-in-part of my application Ser. No. 441,295, filed Feb. 11, 1974, and now abandoned.

BACKGROUND OF THE INVENTION

1. Field of the Invention

This invention relates to the formation of synthetic polymers from phenols and more particularly, to the formation of polyphenylene oxides by the oxidative coupling of phenols using a particular copper-amine complex to effect the reaction.

2. Description of the Prior Art

Polyphenylene oxides, sometimes known as poly(-phenylene oxides) or as polyphenylene ethers, as a general class, are an extremely interesting group of new polymers. These polymers, both homopolymers and copolymers, and processes of producing them are disclosed in my U.S. Pat. Nos. 3,306,874, 3,306,875 and 3,432,466. Modifications of the process of producing these polymers are described in U.S. Pat. Nos. 3,384,619-Hori et al, 3,639,656 — Bennett et al, 3,642,699, 3,661,848 and 3,733,299 — Cooper et al. All of these patents are hereby incorporated by reference.

The process of my U.S. Pat. No. 3,306,875 involves the self-condensation of a monovalent phenol using a catalyst comprising a tertiary amine-basic cupric salt complex. Both polymers and diphenoquinones are products of this reaction depending on the reaction conditions and the phenols used. Under the polymer-forming conditions the phenols which can be oxidatively coupled to polymers have the structural formula:

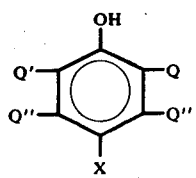

A.

where X is a hydrogen, chlorine, bromine or iodine; Q is hydrogen, hydrocarbon radicals, halohydrocarbon radicals having at least 2 carbon atoms between the halogen atom and the phenol nucleus, hydrocarbonoxy radicals and halohydrocarbonoxy radicals having at least two carbon atoms between the halogen atom and the phenol nucleus; and Q' and Q" are the same as Q and in addition, halogen with the proviso that Q, Q' and Q" are all free of a tertiary α-carbon atom.

The polymers formed by this reaction will have the formula:

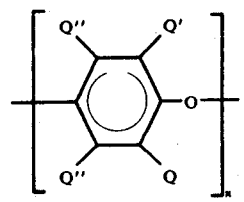

B.

where the oxygen atom of one repeating unit is connected to the phenylene nucleus of the next repeating unit; Q,Q' and Q" are as defined above; and $n$ is a number representing the average degree of polymerization and is at least 100, if the polymer is to have good molding and film-forming properties.

The formation of the polyphenylene oxide involves an oxidative-coupling of the phenol using as the oxygen carrying intermediate, a tertiary amine-basic cupric salt complex. Except for those phenols which are so sterically hindered that they can only form diphenoquinones, the products of the reaction are a mixture of diphenoquinones and polyphenylene oxides, with the ratio of these two products being dependent upon the reaction conditions used. Reaction conditions can be so chosen that either polyphenylene oxides or diphenoquinones are produced with only a very small amount of the corresponding other product. My U.S. Pat. No. 3,306,874 is similar to 3,306,875 except that primary and secondary amines are used in place of tertiary amines, and a more limited class of phenols must be used as the starting material.

The Hori U.S. Pat. No. 3,384,619 also relates to a process for preparing polyphenylene oxides from phenols. By using a very high ratio of certain specific tertiary amines, typically 10 moles of amine per mole of phenol, and relatively high copper to phenol ratios, typically 0.1 moles of copper per mole of phenol, complexes of non-basic cupric salts with the tertiary amine can be used to effect the polymerization reaction, providing the reaction is carried out in a solvent system containing at least 5 weight percent of a low molecular weight alcohol. The above ratio of 10 moles of tertiary amine per mole of phenol, on a weight basis, means that 8 grams of even a low molecular weight amine such as triethylamine is required per gram of 2,6-xylenol.

The process disclosed in the Bennett et al U.S. Pat. No. 3,639,656 is an improvement over the Hori et al process. It is based upon using a complex of a primary or secondary amine with an anhydrous non-basic cupric salt which permits using a smaller amount of this complex, with relation to the phenol than Hori et al and also eliminates the use of the alcohol. Typically 0.01 mole of copper and 0.15 mole of amine is used per mole of phenol.

The Cooper et al U.S. Pat. No. 3,642,699 discloses the use of a cuprous salt complex of a primary, secondary or tertiary amine to which a low molecular weight alkyl alcohol is added prior to the addition of the phenol reactant. In this way the alcohol forms a part of the catalyst. In their U.S. Pat. No. 3,661,848, Cooper et al disclose that by forming the cupric salt complex of a primary or secondary amine in the presence of a low molecular weight alkyl alcohol, copper salts can be used in their hydrate form and even aqueous solutions of the copper salt can be used to form the complex. In both of these patents the moles of copper and amine per mole of phenol are similar to those of the Bennett et al patent.

The Cooper et al U.S. Pat. No. 3,733,299 discloses that an alkali metal bromide or alkaline earth metal bromide acts as an activator for the cupric or cuprous salt complexes of primary, secondary or tertiary amines used to oxidatively couple phenols to polyphenylene oxides. The amines which can be used are the same as those disclosed in my U.S. Pat. Nos. 3,306,874 and 3,306,875. Although this activation by bromide permits the reduction of the amount of copper to 0.0033 mole per mole of phenol, the amount of amine is still typically .15 mole per mole of phenol.

SUMMARY OF THE INVENTION

The subject invention is an improved process for the oxidative-coupling of phenols to high molecular weight polyphenylene oxides with an oxygen-containing gas in the presence of a copper-amine complex which has four essential ingredients: copper ion, which can be either cuprous or cupric ion, bromide ion, and at least one member of a limited class of secondary alkylene diamines and at least one member of a limited classs of tertiary monoamines. The process is an improvement over that of the prior art in that the copper-amine complex is so active that it can be used in extremely low concentrations relative to the concentration of the phenol monomer and is so hydrolytically stable that no provision needs to be made for the removal of water when reaction systems are used where the water formed by the oxidative coupling reaction would produce a separate phase.

The activity of this copper-amine complex can be utilized in several ways. Using very low concentration of the catalyst with respect to the monomer results in overall substantial reduction in the cost of the process, but higher concentrations can be used to reduce the reaction time to produce a given molecular weight or higher molecular weight in a given time to increase the throughput capacity for a given size reactor. The hydrolytic stability of the copper complex can be taken advantage of in that it permits the use of a non-polar solvent, for example, toluene, benzene, chlorobenzene and other inexpensive and readily available commercial solvents. Under normal conditions, the oxidative coupling of phenols to polyphenylene oxides in such solvents would necessitate the use of drying agents or other means of the removal of the water formed by the oxidative coupling reaction. However, this does not preclude the use of these active complexes in polar solvents used in the prior art to avoid the necessity of the removal of the water produced by the oxidative coupling reaction.

In my U.S. Pat. No. 3,306,875, I disclose that the tertiary polyamines which have only two or three aliphatic or cycloaliphatic carbon atoms separating the two tertiary amino nitrogens represent a class of polyamines which are superior to the other aliphatic tertiary amines in forming complexes with basic cupric salts which are formed from either cuprous or cupric salts. In marked contrast, I disclose in my U.S. Pat. No. 3,306,874 that these same primary and secondary polyamines which have only two or three aliphatic or cycloaliphatic carbon atoms separating the two primary or secondary amino nitrogens represent a class of polyamines which are strong chelating agents and form complexes with copper salts which can so completely envelop the copper that their copper complexes are less reactive catalysts than the copper complexes with other aliphatic primary or secondary mono- or polyamines in the oxidative coupling of 2,6-substituted phenols.

While this teaching is still true, I have now discovered that the copper salt complexes, either cupric or cuprous salt complexes, of a limited class of these diamines, and more specifically a limited class of secondary diamines, are an exception to this above-quoted teaching from my U.S. Pat. No. 3,306,874, provided they are utilized with other components to form a combination catalyst which is extremely active for the oxidative coupling of phenols to polyphenylene oxides. Furthermore, this combination catalyst is so hydrolytically stable that it can be used in conjunction with solvent systems in which the by-product water of the oxidative coupling reaction forms a separate phase. This exceptional property of the combination copper salt complexes of this invention sets them apart and distinguishes them as having a unique property not possessed by the other copper salt complexes of other amines and especially the very closely related polyamines. It is believed that this unique property is directly attributable to the two bulky alkyl substituents on the nitrogen atoms of the diamine.

When attempts are made to oxidatively couple phenols at phenol to copper ratios of 175 or greater, in the presence of a copper complex of a primary or secondary ethylene or propylene diamine, it is not surprising, in view of the teaching of my U.S. Pat. No. 3,306,875, that no exotherm is noted and no polymer of a useful molecular weight is obtained in any reasonable length of time. However, when a secondary ethylene or propylene diamine wherein the two alkyl substituents are bulky, for example, the substituents are isopropyl or a tertiary alkyl group, is used to form the copper complex and is used in conjunction with at least three moles of trimethylamine per mole of copper, chlorobenzene as a solvent and a reaction temperature of 40° C., polymerizations could be effected to obtain polyphenylene oxides of acceptable molecular weight, but reaction times are generally in the order of two hours or more. Improvement in molecular weight and somewhat shorter reaction times are obtained by using 2 to 10 percent methanol in conjunction with the chlorobenzene solvent and still further improvements are obtained by utilizing a phase transfer agent, for example, quaternary ammonium or phosphonium salts described by Charles M. Starks in *J. Am. Chem. Soc.* 93, 195 (1971). Still further improvements are obtained when the copper salt is changed progressively from cupric chloride to cuprous chloride to cuprous bromide to cupric bromide. Toluene and benzene can be used in place of chlorobenzene as the solvent but generally requires the presence of methanol. Although other lower alkanols or glycols can be used in place of the methanol, there is no apparent advantage.

At this stage, an example of the optimum conditions for such a reaction is as follows. A solution of 0.67 g. of cupric bromide, 0.51 g. of N,N'-di-t-butylethylenediamine, 1.08 g. of tricaprylmethylammonium chloride and 6.2 ml. of a chlorobenzene solution containing 0.17 g. of trimethylamine per ml. was prepared in 10 g. of 2,6-xylenol and 10 ml. of methanol and then diluted to 100 ml. with chlorobenzene to prepare a stock solution of the copper complex. In a 250 ml., round-bottom, three-neck flask equipped with a paddle stirrer, thermometer and oxygen inlet tube and containing 90.3 ml. of chlorobenzene was heated to 40° C. When this temperature was attained, 16.7 ml. of the above copper complex solution was added and oxygen bubbled in for approximately 2 minutes, and 9.02 g. of 2,6-xylenol as added all at once. An exotherm to 50° C. occurred over a period of 8 minutes. The increase in viscosity was followed by use of a calibrated pipette. After 32 minutes, the reaction mixture had become too viscous to conveniently determine the efflux time from the pipette. The reaction was stopped by adding 2 ml. of concentrated hydrochloric acid. After filtering the reaction mixture through diatomaceous earth, the polymer was precipitated with methanol containing 2 ml. of concentrated hydrochloric acid. After filtering, washing and drying, the polymer weighed 9.17 g. and had an intrinsic viscosity, measured in chloroform at 25° C. of 0.74. The ratio of copper to nitrogen to phenol to bromine in this reaction was 1:8:175:2. In determining this ratio, only the nitrogen from the secondary diamine and tertiary amine was used.

When the reaction was repeated but increasing the phenol to copper ratio to 350 and initiating the reaction at 22° C. which exothermed to 47° C., the reaction required 133 minutes to produce a polymer having an intrinsic viscosity of 0.47. Decyltributylphosphonium bormide could also be used as the phase transfer agent. Dropwise addition of the xylenol over a period of 8 to 16 minutes reduced the temperature produced by the exotherm to about 31° C. and resulted in producing a polymer having an intrinsic viscosity of 0.47 in 60 minutes. In this case, 112 ml. of toluene containing 1.43 ml. of methanol was used as a solvent and the xylenol was dissolved in 10 ml. of toluene.

A much more convenient means of handling the copper diamine complex was found when it was determined that a methanol solution of cupric bromide when added to the diamine precipitated the complex of one mole of the copper salt to one mole of the diamine as a crystalline compound which could be purified by recrystallization. These complexes of cuprous bromide and cupric bromide with the various diamines of this invention are new chemical compounds which are disclosed and claimed in my U.S. Pat. No. 3,914,266 assigned to the same assignee as the present invention. All of these copper complexes are useful in making the combination catalyst forming the subject matter of the instant application. Using the solid complex of cupric bromide and N,N'-di-t-butylethylenediamine in conjunction with the various tertiary amines led to the finding that a source of bromide ion, for example, sodium bromide, further enhanced the activity of the catalyst so that the phase transfer agent, although it could still be used, was no longer required. Furthemore, the phenol to copper ratio could now be increased to 500 and even 550 dependent on the amount of bromide ion added. Further work, as will be described hereinafter, led to the discovery of conditions which permitted this ratio to be still further raised to as high as 1400.

It was clearly demonstrated that the bromide ion was contributing to the hydrolytic stability of the copperamine complex when it was found that if water containing a dissolved bromide salt, for example, sodium bromide, was brought in contact with the red complex of the copper salt with the diamine, no color change or evidence of decomposition could be observed. However, in the absence of a dissolved bromide salt, water readily decomposed the solid complex as evidenced by the bright red color of the complex changing to the blue green color characteristic of copper hydroxide complexes.

Although previous work had indicated that cuprous bromide was not as effective as cupric bromide, it was found that they were equivalent under the new conditions of adding additional bromide providing one additional equivalent of bromide ion was added per mole of cuprous bromide. Not quite as effective, however, was the addition of two equivalents of bromide ion per mole of cuprous chloride. With this as background, my invention can be described as follows.

In carrying out my process, the polyphenylene oxide is formed by passing an oxygen-containing gas through a solution in which both the phenolic monomer and the copper-amine complex are soluble under the polymer-forming reaction conditions described in my above-referenced U.S. Pat. Nos. 3,306,874 and 3,306,875, which are hereby specifically incorporated by reference for teaching of these reaction conditions. The process is broadly applicable to all those phenols disclosed in my prior above-referenced patents as capable of forming polyphenylene oxides. For the same reasons pointed out in these patents, my present process is preferably used with phenols having the formula:

C.

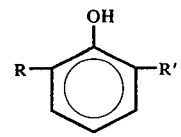

where R and R' are lower primary alkyl groups, examples of which are methyl, ethyl, n-propyl and those $C_{4-8}$-alkyl groups wherein the $\alpha$-carbon atom has two hydrogens, i.e., the two hydrogens on the carbon atom of the alkyl group having the free valence. Examples of such alkyl groups are n-butyl, iso-butyl, n-amyl, iso-amyl, 2-methylbutyl, n-hexyl, 2,3-dimethylbutyl, 2-, 3- or 4-methylpropyl, the corresponding heptyl and octyl groups, etc. In addition, R' can be secondary alkyl, i.e., the $\alpha$-carbon atom has only one hydrogen, for example, isopropyl, sec,-butyl, 1-ethylpropyl, etc. Preferably, the alkyl are straight chain rather than branched. Since the polyphenylene oxides obtained from those phenols where R and R' are other than methyl have no more desirable properties than those polyphenylene oxides obtained from the phenol where R and R' are both methyl, and since 2,6-xylenol is the most readily available and cheapest 2,6-dialkyl-substituted phenol, I prefer to use it as the starting phenol. It produces poly(2,6-dimethyl-1,4-phenylene oxide).

The secondary alkylene diamine component of the complex has the formula:

D. $R_bHN-R_a-NHR_c$

where $R_a$, $R_b$ and $R_c$ are defined hereinafter. The particular diamines corresponding to this formula, broadly need to meet only one requirement, i.e., that there be at least two and no more than three carbon atoms separating the two amino nitrogen groups and that these carbon atoms to which the amino nitrogens are attached be aliphatic. Preferably, there are only two carbon atoms separating the two amino nitrogens, i.e., the two amino nitrogens are on adjacent carbon atoms. These two or three carbon atoms separating the amino nitrogens can be either acyclic or cyclic alkyl carbon atoms. Where substitutents on these acyclic carbon atoms or ring configurations of the cyclic alkyl groups are such that stereo isomers exist, any of the possible isomers can be used. However, the preferred structure will be that which provides for stronger complexing of the cuprous or cupric salt.

The balance of the molecule making up the diamine has little influence either on its ability to complex the copper salt or on its ability to catalyze the oxidative coupling reaction. Since any substituents would have to be non-reactive with amine groups, be oxidatively stable during the oxidative coupling reaction in which they are part of the catalyst, and be non-reactive with either the phenol starting material or the epolyphenylene oxide products, I prefer that the balance of the molecule be saturated aliphatic, either acyclic or cyclic. However, where the balance of the molecule contains aromatic groups, preferably the groups are aryl or saturated aliphatic substituted aryl, and more preferably are phenyl or lower alkyl substituted phenyl groups. Typical examples, therefore, which $R_a$ can be, are ethylene, 1,2- or 1,3-propylene, 1,2-, 1,3- or 2,3-butylene, the various pentylene isomers having from two to three carbon atoms separating the two free valances, phenylethylene tolylethylene, 2-phenyl-1,2-propylene, cyclohexylethylene, 1,2- or 1,3-cyclohexylene, 1,2-cyclopropylene, 1,2-cyclobutylene, 1,2-cyclopentylene, etc.

Because the increased length of the carbon chain of the $R_a$ moiety does not increase the catalytic acitivity of the copper salt complex in the oxidative coupling reaction, does not increase the ability of the amine to complex the copper salt and increases the amount of amine which must be used to provide a particular molar amount, I prefer to use those diamines having the above general formula where $R_a$ is $C_{2-4}$-alkylene or $C_{3-7}$-cycloalkylene with the two amino groups attached in such a way that there is at least two and no more than three carbon atoms separating the two nitrogen atoms, numerous examples of which are given above.

Both because diamines having the two amino groups attached to adjacent carbon atoms are readily prepared from olefins by chlorination or bromination followed by reaction with the desired amine and because such diamines are strong complexing agents for the copper salts, I prefer the above-described diamines in which there are only two carbon atoms separating the two nitrogen atoms. The most readily available, cheapest and therefore the most preferred embodiment would be where $R_a$ is ethylene, i.e.,

E. —CH$_2$—CH$_2$—.

$R_b$ and $R_c$ is isopropyl or an α-tertiary alkyl group, i.e., is a tertiary alkyl group having no hydrogens on the α-carbon atoms. The substituents on the α-carbon atom making up the balance of the tertiary alkyl group can be straight or branched-chain alkyl, cycloalkyl, aryl, alkaryl, or alkyl. The simplest such α-tertiary alkyl group is t-butyl. As the number of carbon atoms in the tertiary alkyl group of the amine increase, there is some loss in catalytic activity of its copper salt complex to catalyze the oxidative coupling reaction. By the time the tertiary alkyl group of the amine is the t-octyl group

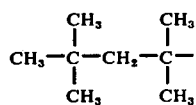

F.

having two quaternary carbon atoms, the copper complex of the amine has become substantially less active. Therefore, I prefer that these α-tertiary alkyl groups have no more than eight carbon atoms and no more than one quaternary carbon atom, i.e., only one carbon atom having no hydrogen. They can be described as $C_{4-8}$-tertiary alkyl groups in which only the α-carbon atom has no hydrogen. Typical examples of such groups which $R_b$ and $R_c$ may be are: t-butyl, 2-methylbut-2-yl, 2-cyclohexylrop-2-yl, 2-methylpent-2-yl, 3-methylpent-3-yl, 2,3-dimethylbut-2-yl, 2-methylhex-2-yl, 3-methylhex-3-yl, 3-ethylbut-3-yl, 2,3- and 2,4-dimethylpent-2-yl, 2-methylhept-2-yl, 3-methylhept-3-yl, 4-methylhept-4-yl, 3-ethylhex-3-yl, cumyl (2,2-dimethylbenzyl), etc. In addition to the above-mentioned acyclic alkyl groups, they can be cyclic alkyl groups, for example, 1-methylcyclopentyl, 1-methylcyclohexyl, etc.

The tertiary amines which I can use in conjunction with the above secondary diamines in forming the above active copper-amine complex can be either certain heterocyclic amines or certain trialkyl amines which are characterized by having the amine nitrogen attached to at least two groups which have a small cross-sectional area. In the case of trialkyl amines, the loss in activity of the copper-amine complex is so marked in going from a methyl to ethyl substituent on the nitrogen that I prefer that at least two of the alkyl groups be methyl with the third being $C_{1-8}$ primary or $C_{3-8}$ secondary alkyl, and even more preferably, those where the third substituent has no more than four carbon atoms. Of the various heterocyclic amines, the two that I have found which give the greatest activity in conjunction with the copper-amine complex for the oxidative coupling reaction are N-methylpyrrolidine and triethylene diamine. The six-membered ring heterocyclic amine, N-methylpiperidine, is essentially ineffective in comparison to the closely related five-membered ring heterocyclic amine, N-methylpyrrolidine.

In order for the above secondary diamines and tertiary amines to function properly in forming an active complex with the copper, I have determined that there must be no competition of these amines with the ammonium ion ($NH_4^+$) which can also form strong complexes with copper ions. This is not to be confused with quaternary ammonium ions ($R_4N^+$) such as found in the phase transfer agents described above. Generally, this presents no problem since there is no source of ammonium ions normally present in the reactants used. However, this limitation must be kept in mind in choosing the source of bromide ion which will be discussed later.

The source of copper ion can be any of the cupric or cuprous salts disclosed in my U.S. Pat. No. 3,306,874, or 3,306,875, but is preferably a halide. In view of the fact that bromide ion is also required to form the active copper-amine complex, it is generally preferred to use cupric bromide or cuprous bromide since they both serve as a source of both copper ion and bromide ion and eliminate the presence of non-essential anions from the reaction mixture that would compete with the bromide ions for to satisfy the valences of the copper ion in the complex. As already discussed, copper bromides give more active catalysis than the other copper salts, including the other halides.

The source of bromide ion can be any of the inorganic bromides, i.e., metal bromides, for example, except ammonium bromide for the reasons stated above, including bromine itself and hydrogen bromide, or an organic bromine containing compound which under the reaction conditions is caused to produce a bromide ion. A particularly useful example of such a compound is 4-bromo-2,6-xylenol since under the reaction conditions the xylenol moiety is incorporated in the polymer at the same time that the bromo substituent is converted to bromide ion. In the specification and claims, I use the term "bromide ion" to include the bromine present in the source either as bromide or as a potential source of bromide, e.g., the bromine present in 4-bromo-2,6-xylenol. The only basic requirement is that the source of bromide ion be capable of supplying a form of bromide ion which is soluble in the reaction mixture. If the source itself is insoluble, it can still be satisfactory if it forms soluble complexes with the amine or produces a soluble product under the reaction conditions used for the oxidative coupling reaction. When metal bromides, other than the copper bromides, are used the particular metal used is merely one of choice. They can be any of the known bromides of the metals of the periodic system. Since some of these also form complexes with amines, e.g., cobalt, manganese, nickel, etc., suitable adjustments in the amount of amine used must be made when such metal bromides are used. Because they are relatively cheap and readily available I prefer, when using a metal bromide as the source of bromide ion, to use the alkali or alkaline earth metal bromides, of which the cheapest and, therefore, preferred, is sodium bromide.

Hydrogen bromide will react with amines to form the amine hydrobromide salt. If desired, the latter can be used as the bromide source or additional amine can be used in the reaction mixture to compensate for the formation of the salt. Bromine will brominate the phenol reactant and simultaneously produce hydrogen bromide, which will require additional amine or advantage can be taken of this acidic by-product to convert a copper oxide, carbonate, basic carbonate or hydroxide to copper bromide in the absence of the amine as will be discussed later and illustrated in the example. The brominated phenol also is a source of acidic bromide ion and requires additional amine to compensate for this fact. Generally such adjustments are made using the tertiary amine rather than the more costly secondary diamine. While this means that more tertiary amine is required with these sources of bromide ion than when a metal bromide is used, the additional amount of amine is much less than an equivalent of amine per equivalent of acidic bromide ion. It appears to be a matter of providing a reaction mixture of sufficient basicity, and, therefore, the amount of amine required appears to be more a matter of concentration, i.e., for a given Br to Cu ratio, a higher ratio of tertiary amount to Cu ratio is required when the phenol to Cu ratio is 1200 then when it is 550, yet the actual concentration of the tertiary amine in the two solutions might well be the same.

In order for the combination copper-amine complex to be in a very active form, the molar ratio of bromide ion to copper ion should be at least two and preferably at least three, and can be twelve or more.

The molar ratio of the secondary diamine to copper should be at least one, i.e., at least two atoms of nitrogen supplied by the diamine per atom of copper. Higher ratios permit the use of lower concentrations of the copper-amine complex based on the phenolic monomer to be used. For example, as the ratio of diamine to Cu ratio is increased from 1 to 2 to 3, the phenol to Cu ratio can be increased from 1,100 to 1,300 to at least 1,400. At these low catalyst concentrations bromide ion to Cu ratios of 6 to 12 are used. These features as will be demonstrated in the examples illustrating the preferred embodiments of my invention, it should be kept in mind that even these high bromine to copper ratios, translate to 0.008 to 0.009 mole of bromine ion per mole of phenol monomer or inversely 110 to 117 moles of phenol monomer per mole of bromine ion.

The ratio of equivalents of tertiary amine nitrogen to moles of copper ion should be at least six, i.e., there should be at least six atoms of nitrogen per atom of copper. It will be obvious that when the tertiary amine is a monoamine, that the molar ratio is the same as the above ratio. As a general rule, a more active catalyst will result when the ratio of total equivalents of amine nitrogen of the secondary diamine and tertiary amine to bromide ion is at least 1. As will be readily apparent this will always be the case when the bromide to copper ratio is 8 or less. When the extremely active combination copper-amine complexes are used which permit phenol to copper ratios of 1,100 to 1,400 to be used, i.e., bromine ion to copper ion ratios of 6 to 12, ratios of equivalents of tertiary amine to moles of copper ion in the range of 10 to 20 are generally used. It should be kept in mind that even when using 3 moles of secondary diamine, 20 moles of a tertiary monoamine per mole of copper, to permit use of a phenol monomer to copper ratio of 1,400 still represents the use of total equivalents of amine nitrogen of only 0.018 per mole of phenol monomer, or approximately 1/8 of the amount used by Cooper et al.

Although a lower alkanol or glycol does not need to be present in the reaction medium, its presence does aid in solubilizing the combination of catalyst system initially, especially when a metal bromide is used as the source of bromide ion. Although any of the lower alkanols or lower alkenols or lower alkylene glycols can be used, the most readily available cheapest and entirely satisfactory member of this group is methanol and is therefore preferred, especially since methanol is also used in the final step in precipitating the polymer from the reaction mixture. When used, it generally is used in amounts of 6% by weight based on the phenol monomer. This represents an amount less than 1% of the total reaction mixture. The amount of alcohol used is not critical and can be 250%, or greater by weight based on the amount of phenol. However, it should be kept in mind that too much methanol would cause precipitation of the polymer. Since I can run the oxidation coupling reaction without the use of any alkanol, it is obvious that it is not a critical component of the reaction system.

Although a phase transfer agent does not need to be present in the reaction medium, its presence within the reaction medium permits, in general, the polymerization reaction to be carried out in a shorter period of time, the reaction to be carried out in the absence of methanol or other polar hydrolytic solvents, the reaction to be carried out at higher reaction temperatures — i.e. temperatures within the range of from about 40° C. to about 60° C. — with less deactivation of the catalyst than that which normally occurs in the absence of a phase transfer agent, the reaction to be carried out at the aforementioned higher reaction temperatures at higher monomer solids levels — i.e., monomer to solvent weight ratios of 15:85 to 30:70 or even higher — in the presence of lower alkanols or glycols with less risk of polymer precipitation during the polymerization reaction. When a phase transfer agent is used in the presence of methanol or other polar hydrolytic solvents, any quaternary ammonium, phosphonium or tertiary sulfonium phase transfer compound or mixtures thereof can be used in any amount subject to the proviso that the mole equivalent ratio of phase transfer agent per atom of copper is at least about 0.1:1, preferably about 0.25:1 or even higher. When a phase transfer agent, such as Aliquat 336 is employed, which is the quaternary ammonium salt tricaprylylmethylammonium chloride whose average molecular weight is 442, it generally is used in amounts of about 0.1% by weight based on the weight of phenol monomer, e.g. 2,6-xylenol. This generally represents a phase transfer agent amount of about 0.01% by weight of the total reaction mixture. When a phase transfer agent is used in the absence of methanol or other polar hydrolytic solvents, e.g. wherein benzene, toluene, etc. nonpolar compounds are employed as the sole solvent, it is essential that the mole equivalent ratio of phase transfer agent per atom of copper be at least about 1:1 or even higher. The ability to carry out the polymerization reaction in the absence of methanol or other polar hydrolytic solvents by the utilization of phase transfer agents is economically attractive in that the polymer can be isolated from the polymerization reaction medium by means of spray drying, steam precipitation or other methods which would be less attractive economically in a process which contains the additional polar hydrolytic solvent which then requires subsequent separation by distillation of the mixed solvents.

Where a preformed copper salt complex is to be used in making the combination of the catalyst, they are most generally made by the method disclosed in my above-identified copending application. In the case of the cupric bromide complexes, cupric bromide is readily soluble in methanol or ethanol and upon addition of the diamine to the alcoholic solution of the cupric bromide, the cupric bromide complex precipitates from the solution and is readily filtered off. Generally, the alcohol solution is heated to increase the solubility of the cupric salt and is cooled prior to isolation of the complex to increase the amount of the cupric bromide complex which precipitates and aids in its recovery by mere filtration.

In the case of the cuprous bromide complexes, cuprous bromide is not very soluble in an inert solvent. Acetonitrile dissolves it to the extent of 3.86 g./100 ml. at 18° C., probably as a weak complex so it is the most convenient solvent to use. Making a mixture of the diamine and acetonitrile in the presence of the solid cuprous bromide slowly forms the desired complex but heating the solution up to the reflux temperature will hasten the reaction. A convenient way to insure that there is no uncomplexed cuprous bromide is to place the cuprous salt in the extraction thimble of a Soxhlet apparatus and use a mixture of acetonitrile and the appropriate diamine in the reboiler section. On heating, the acetonitrile refluxes up and forms a soluble complex with the cuprous bromide which, on returning to the reboiler section precipitates the insoluble complex of the cuprous bromide and the diamine.

Two of the cheapest and most readily available forms of copper are cuprous oxide and basic cupric carbonate. These two convenient sources of copper can be used in conjunction with preferred 2,6-dialkylphenols to make the combination catalyst directly to include all of the essential ingredients. By using an excess of the 2,6-disubstituted phenol to insure making only the para-bromo derivatives thereof and carrying out the bromination in the presence of the cuprous oxide or basic cupric carbonate, the HBR generated by the bromination of the phenol will convert these two sources of copper to copper bromides. It is generally desirable to add additional methanol to the phenol prior to this bromination procedure in order to produce a liquid phase. After the copper bromide is formed, the desired amount of the secondary diamine and the tertiary amine are added to provide the desired ratios of these amines to copper. Any excess hydrogen bromide will, of course, be converted to the hydrobromide salt of the amines. This combination catalyst can then be diluted to a standard volume, preferably the use of solvent which will be used for the oxidative coupling reaction, so that aliquots can be removed from the standard volume to provide a given calculable amount of catalyst for the reaction. By so choosing, the amount of copper, bromine and amines used any desired ratio of these variables in the combination catalyst can be obtained. This method of making the catalyst is desirable when very high ratios of bromine to copper are desired which would be difficult to obtain by the use of alkali metal bromide because of solubility limitations.

In general, the polymerization reaction is performed in a solvent of the general class and the general procedure disclosed in the above Hay patents for polymer formation. Generally, the solvent, usually benzene, toluene or chlorobenzene, and the ingredients for forming the combination of copper-amine complex or the above preformed combination copper-amine complex are combined, and air, oxygen or other oxygen-containing gas is bubbled through the complex-solvent solution while the solution is being stirred. After the complex is in solution, the reaction is initiated within a temperature range of from about 15° C. up to about ambient room temperature by introducing the phenol reactant, preferably diluted with some of the reaction solvent to provide a liquid phase. The rate of addition is such as to provide a controllable exotherm so that the temperature does not exceed substantially 60° C., preferably 40° C. The progress of the polymerization reaction is readily followed noting the efflux time from a calibrated pipette. When the desired intrinsic viscosity is obtained, the reaction is stopped, generally by adding an acid such as hydrochloric acid or acetic acid. The polymer is subsequently precipitated by adding an excess of methanol to the reaction mixture preferably containing a small amount of hydrochloric acid to insure solubilization of the catalyst system. Other variations and details of the polymerization reaction are readily discernible from the above Hay patents.

In order that my invention may be more readily understood, the following examples are given by way of illustration and not by way of limitation. In all of the examples, the temperatures are in degrees of centigrade and the intrinsic viscosities are measured in chloroform at 25° C.

GENERAL PROCEDURE

A. A mixture of 73 ml. of benzene, the required amount of preformed complex of cuprix bromide and N,N'-di-t-butylethylenediamine, the desired amount of N,N-dimethyl-n-butylamine, and the desired amount of a methanol solution of sodium bromide containing 0.31 g. of the sodium bromide in 10 ml. of methanol is placed in a 250 ml. round-bottom, 3-neck flask equipped with a paddle stirrer, thermometer and oxygen inlet tube. Oxygen is bubbled through the reaction mixture, but the copper-amine complex is not completely soluble until some of the phenol is added. A solution of 9.96 g. of 2,6-xylenol (also known as 2,6-dimethylphenol) dissolved in 10 ml. of benzene is added slowly from a dropping funnel over a period of about 15 minutes, during which time an exotherm is noted and the reaction becomes cloudy as water separates a second phase. The progress of the reaction is followed by periodically measuring the efflux from a pipette which has been calibrated against equivalent solutions of polyphenyleneoxides of known intrinsic viscosities. Generally, the reaction is stopped when the indicated intrinsic viscosity is about 0.5. However, in some cases, towards the end of the reaction, there is a rapid increase in the viscosity so that the desired goal is overshot before the polymerization reaction is terminated by the addition of the appropriate amount of either acetic acid or the tetrasodium salt of ethylenediaminetetracetic acid. Methanol is added to precipitate the polymer which is then filtered, washed with methanol and dried at 50° under vacuum. In Examples I through XIII the experimental procedure of General Procedure A, described above, were followed. Any deviations from the General Procedure are appropriately noted in the individual examples descriptions of which follow:

EXAMPLE I

This example illustrates the benefits to be gained by the use of additional bromide ion and the contribution of a phase transfer agent. Although necessary for the reaction in the absence of added bromide ion, the phase transfer agent contribution in the presence of added bromide ion is minimal. The amount of reactant used over and above that employed in General Procedure and the time in minutes, to reach the indicated intrinsic viscosity $[\eta]$ are given in Table I. The volume of methanol shown is that for the methanol solution containing the dissolved sodium bromide. The phase transfer agent was tricaprylymonomethylammonium chloride. Similar results were also obtained when other phase transfer agents were used, for example, decyltributylphosphonium bromide.

TABLE I

| Run | Phase Transfer Agent g. | Tertiary Amine g. | Moles Added Bromide per Mole/ CuBr$_2$ | ml. MeOH | $[\eta]$ | Time |
|---|---|---|---|---|---|---|
| A | 0.049 | 0.165 | 0 | 0.6* | 0.5 | 43 |
| B | 0.049 | 0.165 | 1 | 0.6 | 0.5 | 30 |
| C | 0 | 0.165 | 1 | 0.6 | 0.5 | 37 |

*-contained no sodium bormide

The Cu:N:M:Br ratios employed in this example by run are as follows:

| Run | Cu (Copper ion) | N (Total dequivalents of amine nitrogen) | M (2,6-xylenol) | Br (bromine ion) |
|---|---|---|---|---|
| A | 1 | 11 | 450 | 2 |
| B | 1 | 11 | 450 | 3 |
| C | 1 | 11 | 450 | 3 |

In all three Runs, A, B and C, other tertiary amines that give similar results when an equivalent amount is used in place of the N,N-dimethyl-n-butylamine are; trimethylamine, N-methylpyrrolidine, N-dimethylcyclohexylamine, N,N-dimethylethylamine and N,N-dimethylpropylamine.

When polymerization Run C was twice repeated, the amount of complex, tertiary amine and methanol were decreased so that the M:Cu ratio was increased to 500 and 550. The resulting reaction time to reach an apparent intrinsic viscosity of 0.5 increased to 65 and 90 minutes, respectively. However, this increase in reaction time could be counteracted by increasing the amount of bromine ion. When this was done by increasing the amount of sodium bromide dissolved in the methanol so that the amount of methanol solution used was held constant at M:Cu ratio of 500 and a Br:Cu ratio of 4 and 5, the resulting reaction times to reach an apparent intrinsic viscosity of 0.5 were reduced to 60 and 51 minutes, respectively.

Again, when polymerization Run C was twice repeated, at a M:Cu ratio of 550, increasing the Bri:Cu ratio from 1 to 3 decreased the reaction time to 40 minutes. Under these conditions it was also found that decreasing the tertiary amine to copper ratio from 9 to 6 (Cu:N:M:Br = 1:8:550:5) apparently had no effect on the reaction time since an apparent intrinsic viscosity of 0.5 was reached in 38 minutes. However, an attempt to still further reduce the tertiary amine to copper ratio to 4.5 had a drastic effect on the reaction time since after 95 minutes the apparent intrinsic viscosity was only 0.18.

EXAMPLE II

This example illustrates the making of and the using of the combination copper-amine complex from basic copper carbonate. A solution of 4.81 g. of 2,6-xylenol was dissolved in a minimum amount of methanol in a 50 ml. volumetric flask equipped with a microstirring bar.

To this solution, 0.55 g. of basic copper carbonate containing 55.6% copper (0.31 g. of copper) was added. The flask was cooled in ice water while 3.15 g. of bromine dissolved in methanol was added. As soon as the addition of bromine was complete, the flask was removed from the cooling bath and sufficient methanol added while continuing to stir until a clear solution was obtained. After removing the stirring bar, the total volume was made up to 50 ml. with additional methanol.

70 ml. of toluene plus approximately 15% of a solution containing 13.25 g. of 2,6-xylenol dissolved in 15 ml. of toluene was placed in the reaction vessel type described in General Procedure A. To this solution, one ml. of the combination copper-amine complex, prepared as per above, was added while stirring, first — 0.26 ml. of a toluene secondary diamine solution containing 0.1 g. of N,N'-di-t-butylethylenediamine per ml. of the secondary toluene-diamine solution, and second — 0.40 ml. of a toluenetertiary amine solution containing 0.5 g. of N,N-dimethyl-n-butylamine per ml. of toluene-tertiary amine solution. Oxygen was bubbled through the reaction mixture and the balance of the xylenol solution in toluene added dropwise over a period of ten minutes. During this time a vigorous exotherm occurred requiring two additions of ice to the water bath surrounding the reaction vessel. By this means the reaction temperature was kept below 27°. Towards the end of the 27 minute reaction period the indicated intrinsic viscosity increased so rapidly that the goal of 0.5 was greatly exceeded. The reaction was stoped by the addition of twice the theoretical amount of the tetrasodium salt of ethylenediaminetetraacetate (EDTA) needed to complex all the copper. The polymer was precipitated by slow addition of methanol, filtered from the solution, washed with methanol, and dried overnight at 50° in a vacuum oven. The determined intrinsic viscosity was 1.22. The ratio of the various reactants in this example were Cu:N:M:Br = 1:23:1100:8. The ratios of the two amines to copper were 1.5 for the secondary diamine and 20 for the tertiary amine. When this reaction was repeated but decreasing the amount of tertiary amine to copper ratio to 15 and 13, it required reaction times of 36 and 37 minutes to obtain polymers having intrinsic viscosities of 0.73 and 0.64, respectively. When the reaction was twice repeated decreasing the bromine to copper ratio to 7 and increasing it to 10, it increased the reaction time in both cases. When this example was repeated but the ratio of the secondary diamine to copper ratio was reduced to 1 and the ratio of bromine to copper was 6, resulting in ratios of Cu:N:M:Br of 1:22:1100:6, a polymer was produced having an intrinsic viscosity of 0.60 in 50 minutes.

EXAMPLE III

This example illustrates the making of a combination catalyst from cuprous oxide addition to a solution containing 6.65 g. of 2,6-xylenol dissolved in a minimal amount of methanol. To a 50 ml. volumetric flask containg a microstirring bar, 0.4 g. of cuprous oxide analyzing 97.6% was added. While stirring and cooling in ice water bath, 4.35 g. of bromine dissolved in methanol was added. As soon as the addition of bromine was complete, the flask was removed from the cooling bath, and sufficient methanol added to obtain a clear solution while stirring at room temperature. After removal of the stirring bar, additional methanol was added to make 50 ml. of solution. 70 ml. of toluene plus approximately 15% of a solution containing 13.25 g. of 2,6-xylenol in 15 ml. of toluene was placed in the reaction vessel type described in the General Procedure A. Added to this solution was 1 ml. of the aforesaid combination catalyst with stirring, followed by the addition of 0.38 ml. of a toluene-secondary diamine (T/SDA) solution containing 0.1 g. of N,N'-di-t-butylethylenediamine per ml. of T/SDA solution, and then the addition of 0.44 ml. of a toluene-tertiary amine (T/TA) solution containing 0.5 g. of N,N-dimethyl-n-butylamine per ml. of T/TA solution. While bubbling oxygen through the resulting solution, the balance of the xylenol solution was added dropwise over an 8 minute period. Toward the end of the 25 minute reaction period, the indicated intrisic viscosity increased so rapidly that the goal of 0.5 was exceeded. The reaction was stopped and the polymer isolated by the procedure described in Example II. The measured intrinsic viscosity was 0.86. In this example, the ratios of the reactants were Cu:N:M:Br = 1:24:1000:10. The ratios of the secondary diamine to copper and tertiary diamine to copper were 2 and 20, respectively.

The following examples illustrate the use of 4-bromo-2,6-xylenol as the source of additional bromine.

EXAMPLE IV

A solution containing 71 ml. of toluene, 1 ml. of methanol and 0.159 g. of 4-bromo-2,6-xylenol was placed in the reaction vessel type described in General Procedure A. While stirring, 0.039 g. of a preformed 1:1 molar complex of cupric bromide and N,N'-di-t-butylethylenediamine was added, followed by the addition of 0.17 ml. of toluene solution containing 0.1 g. of N,N'-di-t-butylethylenediamine per ml. of T/SDA solution, and the addition of 0.4 ml. of a toluene solution containing 0.5 g. of N,N-dimethyl-n-butylamine per ml. of T/TA solution. While bubbling oxygen through the system, 13.25 g. of 2,6-xylenol dissolved in 15 ml. of toluene was added dropwise over a period of 10 minutes. After a reaction time of 70 minutes, the isolated polymer had an intrinsic viscosity of 0.49. The ratios of Cu:N:M:Br = 1:14:1100:8. The ratios of copper to secondary diamine and copper to tertiary amine were 2 and 10, respectively.

EXAMPLE V

When Example IV above was repeated, except for the modification of increasing the ratio of the tertiary amine to copper to 20, the resulting reaction time was decreased to 57 minutes and intrinsic viscosity of the polymer was increased to 0.54.

EXAMPLE VI

When Example V above with the higher amount of tertiary amine was repeated, except for the modification of increasing the amount of methanol to 2 ml., the resulting reaction time was still further decreased to 40 minutes and the intrinsic viscosity of the isolated polymer was still further increased to 0.63.

EXAMPLE VII

When Example VI above with the increased amine and increased methanol was repeated, except for the modification of increasing the ratio of xylenol to copper to 1200, a polymer having an intrinsic viscosity of 0.73 was obtained in 45 minutes.

EXAMPLE VIII

When Example VII above with the reduced catalyst concentration, was repeated, except for the modification of reducing the amount of methanol to 1 ml., it was found that by increasing the amount of 4-bromo-2,6-xylenol so that the bromine to copper ratio was ten that a polymer having an intrinsic viscosity of 0.88 was obtained in 48 minutes.

EXAMPLE IX

When Example VIII above was repeated, except for the modification of still further increasing the amount of 4-bromo-2,6-xylenol so that the bromine to copper ratio was 12 and the xylenol to copper ratio was 1300, a polymer having an indicated intrinsic viscosity of 0.5 was obtained in 75 minutes.

EXAMPLE X

Repeating Example IX above with higher bromine copper ratio, except for the modification of increasing the amount of tertiary amine so that the tertiary amine to copper ratio was 22, a polymer having an indicated viscosity greater than 0.5 was obtained in 65 minutes. In this reaction, the ratio of the various reactants were Cu:N:M:Br = 1:26:1300:12.

EXAMPLE XI

When Example X above was repeated, except for the modification of increasing the amount of secondary diamine and decreasing the amount of tertiary amine so that their ratios with respect to copper were 3 and 20, respectively, and having the catalyst concentration still further reduced so that the monomer to copper ratio was increased to 1400, a polymer having an intrinsic viscosity of 0.55 was obtained in 79 minutes.

EXAMPLE XII

When Example XI was repeated, except for the modification of reducing the xylenol to copper ratio of 1300, and having the amount of 4-bromo-2,6-xylenol reduced so that the bromine to copper ratio was reduced to 10, a polymer having an intrinsic viscosity greater than 0.5 was obtained in 45 minutes.

EXAMPLE XIII

When Example XII was repeated, except for the modification noted hereafter, it was found that the amount of 4-bromo-2,6-xylenol could be still further reduced so that the bromine to copper ratio was reduced to 8, if the xylenol to copper ratio was reduced to 1100. Under these modified conditions, a polymer having an intrinsic viscosity of 0.52 was obtained in 56 minutes.

EXAMPLE XIV

This example, using 6% methanol by weight based on 2,6-xylenol, when compared to the following Example XV which uses 3% methanol illustrates that in the presence of a polar hydrolytic solvent and in the absence of a phase transfer agent, a reduction in the amount of polar hydrolytic solvent within the reaction medium substantially reduces the rate of polymerization whereby low molecular weight polymer is formed during extended reaction periods.

Catalyst Solution Preparation

A catalyst solution was made up as follows: 4.8 g. of 2,6-xylenol was placed in a 50 ml. volumetric flask and dissolved in methanol. 0.55 g. of basic cupric carbonate assayed at 55.6% copper was added. The flask was cooled in ice and 3.15 g. of bromine in a small amount of methanol was added, with stirring. When the copper carbonate had dissolved, the solution was made up to 50 ml. with methanol.

Polymerization 71.0 ml. of toluene was placed in a 250 ml. R.B. 3-necked flask equipped with a paddle stirrer, thermometer, condenser, dropping funnel and gas-inlet tube. 1.0 ml. of the catalyst solution was added. 0.26 ml. of a toluene solution containing 0.1 g. of N,N'-di-t-butylethylenediamine per milliliter was added. 0.40 ml. of a toluene solution containing 0.5 g. N,N-di-methyl-n-butylamine per milliliter was added. The reaction mixture was stirred well and oxygen was bubbled through the solution at a rate of 0.2 SCFH. 13.25 g. of 2,6-xylenol dissolved in 15 ml. of toluene was added dropwise over a period of 10 minutes. The temperature was kept at 25° C. by means of an ice-cooling bath. Viscosity measurements were made periodically with a calibrated pipette, in 27 minutes $[\eta] = 1.215$. The reaction was stopped by complexing the copper with ethylenediaminetetraacetic acid, trisodium salt. The ratio of $Na_3EDTA:Cu$ was 1.5:1. The polymer was precipitated with methanol, filtered, washed with methanol and dried.

Summarily, the determined intrinsic viscosity of the polymer was 1.215, the molar ratio of Cu:N:M:Br = 1:23:1100:8, and the monomer, solvent, phase transfer agent weight ratios were 2,6-xylenol:methanol:toluene:tricaprylylmethylammonium chloride (referred to hereafter as M:MeOH:Toluene:PTA) = 15:1:85:0.

EXAMPLE XV

Catalyst Solution Preparation

A catalyst solution containing 0.015497 g. of 99.6% cuprous oxide, 0.14 g. bromine and 0.21 g. of 2,6-xylenol per milliliter of methanol was made up as in Example XIV.

Polymerization 213.0 ml. of toluene and 0.14 ml. of methanol were placed in a 500 ml. R.B. 3-necked flask equipped with a vibromixer stirrer, thermometer, condenser, dropping funnel and gas-inlet tube. 1.37 ml. of the above catalyst solution was added. 0.15 ml. of a toluene solution containing 0.5 g. N,N'-di-t-butylethylenediamine per milliliter was added. 1.20 ml. of a toluene solution containing 0.5 g. of N,N-dimethyl-n-butylamine per milliliter was added. The reaction mixture was stirred well and oxygen was bubbled through the reaction mixture at a flow rate of 0.5 SCFH. 39.75 g. of 2,6-xylenol dissolved in 46 ml. of toluene was added dropwise over a period of 9 minutes. The temperature was kept at 25° C. by means by an ice-cooling bath. Viscosity determinations were made as in Example XIV, in 71 minutes $[\eta] = .368$. The reaction was stopped with $Na_3EDTA$ as in Example XIV.

Summarily, the determined intrinsic viscosity of the polymer was 0.368, the molar ratio Cu:N:M:Br = 1:23:1100:8, and the weight ratio of M:MeOH:Toluene:PTA = 15:0.5:84.5:0.

EXAMPLE XVI

This example, by comparison with Example XV, illustrates the improvement in the polymerization rates wherein a phase transfer agent is employed in the presence of a polar hydrolytic solvent.

When Example XV above was repeated, except the 0.08 ml. of a toluene solution containing 0.5 g. of Aliquat 336 per milliliter (0.04 g. of 75% active) was added to the reaction mixture at the start of the oxidation, in 43 minutes $[\eta] = .452$.

Summarily, the determined intrinsic viscosity of the polymer was 0.452, the molar ratio of Cu:N:M:Br = 1:23:1100:8, and the weight ratio of M:MeOH:Toluene:PTA = 15:0.5:84.5:.01.

EXAMPLE XVII

This example, using 1.5% methanol by weight based on 2,6-xylenol, in the absence of a phase transfer agent, illustrates that the rate of polymerization is very slow.

Catalyst Solution Preparation

A catalyst solution containing 0.031014 g. of 99.6% cuprous oxide, 0.28 g. of bromine and 0.42 g. of 2,6-xylenol per milliliter of methanol was made up as in Example XIV.

Polymerization 214 ml. of toluene and 0.06 ml. of methanol were placed in a 500 ml. R.B. flask equipped as in Example XV. 0.69 ml. of the above catalyst solution was added. 0.15 ml. of a toluene solution containing 0.5 g. N,N'-di-t-butylethylenediamine per milliliter was added. 1.20 ml. of a toluene solution containing 0.5 g. of N,N- dimethyl-n-butylamine per milliliter was added. The reaction mixture was stirred well and oxygen was bubbled through the reaction mixture at a flow rate of 0.5 SCFH. 39.76 g. of 2,6-xylenol dissolved in 46 ml. of toluene was added over a period of 11 minutes, cooling in ice water to maintain the reaction temperature at 25° C. Viscosity determinations were made as in Example XIV, in 105 minutes $[\eta] = .272$. The reaction was worked up as in Example XIV.

Summarily, the determined intrinsic viscosity of the polymer was 0.272, the molar ratio of Cu:N:M:Br = 1:23:1100:8, and the weight ratio of M:MeOH:- Toluene:PTA = 15:0.25:84.75:0.

EXAMPLE XVIII

When Example XVII above was repeated, except that 0.08 ml. of a toluene solution containing 0.5 g. of Aliquat 336 per milliliter (0.04 g. of 75% active) was added to the reaction mixture at the start of the oxidation, in 85 minutes $[\eta] = .472$.

This example, by comparison with Example XVII above, illustrates that the copper-amine complexes are retained in their extremely active form even though the reaction is carried out in the presence of a very low amount of a polar hydrolytic solvent, e.g. 1.5% methanol by weight based on the weight of phenol monomer, wherein a phase transfer agent is employed.

Summarily, the determined intrinsic viscosity of The polymer was 0.472, the molar ratio of Cu:N:M:Br = 1:23:1100:8, and the monomer weight ratio M:MeOH:- Toluene:PTA = 15:0.25:84.75:0.01.

EXAMPLE XIX

This example illustrates that the copper-amine complexes do not retain their enhanced catalytic activity when employed at elevated temperatures i.e. 50° C. and above when the reaction is carried out in the presence of a large amount of a polar hydrolytic solvent, i.e., 100% methanol by weight based on 2,6-xylenol, in the absence of a phase transfer agent.

Catalyst Solution Preparation

A catalyst solution containing 0.0031137 g. of 99.6% cuprous oxide, 0.0346 g. of bromine and 0.053 g. 2,6-xylenol per milliliter of methanol was made up as in Example XIV.

Polymerization 166 ml. of toluene and 42 ml. of methanol were placed in a 500 ml. R.B. 3-necked flask equipped as in Example XV. 7.4 ml. of the above catalyst solution was added. 0.11 ml. of a toluene solution containing 0.5 g. of N,N'-di-t-butylethylenediamine per milliliter was added. 1.30 ml. of a toluene solution containing 0.5 g. of N,N-dimethyl-n-butylamine per milliliter was added. The reaction mixture was stirred well and oxygen was bubbled through the reaction mixture at a flow rate of 0.5 SCFH. 39.21 g. of 2,6-xylenol dissolved in 45 ml. of toluene to which 0.33 ml. of a toluene solution containing 0.5 g. of N,N'-di-t-butylethylenediamine per milliliter had been added was added dropwise over a period of 31 minutes. The temperature of the reaction mixture was allowed to rise until the full exotherm was over and the reaction mixture was then heated to 50° C. Viscosity determinations were made using a calibrated pipette, after 78 minutes $[\eta] = .28$. The reaction was stopped by adding Na$_3$EDTA as in Example XIV. Work-up same as in Example XIV.

Summarily, the determined intrinsic viscosity of the polymer was 0.28, the molar ratio of Cu:N:M:Br = 1.28:1000:10, and the weight ratio of M:MeOH:- Toluene:PTA = 15:15:70:0.

EXAMPLE XX

This example by comparison with Example XIX illustrates that the copper-amine complexes have enhanced catalytic activity when the reaction is carried out in the presence of a large amount of polar hydrolytic solvent, i.e., 100% methanol by weight based on 2,6-xylenol and in the presence of a phase transfer agent.

When Example XIX above was repeated, except that 0.08 ml. of a toluene solution containing 0.5 g. of 75% Aliquat 336 (0.03 g., 0.0000678 moles) was added to the reaction pot at the start of the oxidation, in 72 minutes $[\eta] = .446$.

Summarily, the determined intrinsic viscosity of the polymer was 0.446, the molar ratio of Cu:N:M:Br = 1:28:1000:10, and the weight ratio of M:MeOH:- Toluene:PTA = 15:15:70:0.01.

EXAMPLE XXI

This example, and Examples XXII and XXIII which follow, illustrate that the extremely active combination copper-amine complexes of this invention can be employed in the polymerization of a phenol to a polyphenylene oxide in the absence of any polar hydrolytic solvent.

Catalyst Solution Preparation

A catalyst solution was made up as follows: 26.55 g. of 2,6-xylenol was added to a 200 ml. volumetric flask. 12.8 g. of 75% active Aliquat 336 was added. Toluene was added. The solution was cooled in ice and 1.59302 g. of 99.6% cuprous oxide was added with stirring. 17.37 g. of bromine was weighed into an Erlenmeyer flask and after a small amount of 2,6-xylenol was added to this flask, toluene was added. The whole was then added carefully to the stirred, cooled mixture in the volumetric flask. When the cuprous oxide had dissolved, the solution was made up to 200 ml. with toluene.

Polymerization 214 ml. of toluene was placed in a 500 ml. R.B. 3-necked flask equipped as in Example XV. 4.3 ml. of the above catalyst solution was added. 0.32 ml. of a toluene solution containing 0.5 g. N,N'-di-t-butylethylenediamine per milliliter was added. 1.88 ml. of a toluene solution containing 0.5 g. of N,N-dimethyl-n-butylamine per milliliter was added. The reaction mixture was stirred well and oxygen was bubbled through at a flow rate of 0.5 SCFH. 39.77 g. of 2,6-xylenol dissolved in 42 ml. of toluene was added dropwise over a period of 16 minutes, the temperature being maintained at 25° C. by means of an ice bath. Viscosity determinations were made with a calibrated pipette. In 51 minutes $[\eta] = .806$. Work-up as in Example XIV.

Summarily, the determined intrinsic viscosity of the polymer was 0.806, the molar ratio of Cu:N:M:Br = 1:24:700:10, and the weight ratios of M:MeOH:- Toluene:PTA = 15:0:81:0.1.

EXAMPLE XXII

When Example XXI above was repeated, except for the modification of using 3.0 milliliters of the catalyst solution made up as in Example XXI, using 0.22 ml. of a toluene solution containing 0.5 g. of N,N'-di-t-butylethylenediamine per milliliter, using 1.32 ml. of a toluene solution containing 0.5 g. of N,N-dimethyl-n-butylamine, using 39.77 g. of 2,6-xylenol dissolved in 43 ml. toluene added dropwise over a period of 15 minutes, in 152 minutes [η] = .513.

Summarily, the determined intrinsic viscosity of the polymer was 0.513, the molar ratio of Cu:N:M:Br = 1:24:1000:10, and the weight ratio of M:MeOH:Toluene:PTA = 15:0:81:0.05.

EXAMPLE XXIII

When Example XXII was repeated, except for the modification of increasing the diamine nitrogen content of the reaction medium by the addition of the 0.44 ml. of a toluene solution containing 0.5 g. N,N'-di-t-butylethylenediamine per milliliter, in 54 minutes [η] = .617.

Summarily, the determined intrinsic viscosity of the polymer was 0.617, the molar ratio of Cu:N:M:Br = 1:28:1000:10, and the weight ratio of M:MeOH:Toluene:PTA = 15:0:81:0.05.

The polymers obtained by my invention have all the utility disclosed in my above referenced patents. The intrinsic viscosity of 0.5 is more than sufficient for making high quality molded objects and films from the polymer. The polymer can also be blended with other polymers in the same manner as disclosed in the prior art for the polyphenylene oxides obtained by other methods, for example, as disclosed by Fox in his U.S. Pat. No. 3,221,080, Gowan in his U.S. Pat. No. 3,361,851, Cizek in his U.S. Pat. No. 3,383,435, Kambour in his U.S. Pat. No. 3,639,508, etc. Fillers, dies, pigments, flame retardants, stabilizers, modifiers, etc., can also be incorporated prior to or during molding, for example, by extrusion.

Although the above examples have illustrated various modifications and changes that can be made in carrying out my process, it will be apparent to those skilled in the art that other changes and modifications can be made in the particular embodiments of the invention described which are within the full intended scope of the invention as defined by the appended claims.

What I claim as new and desire to secure by Letters Patent in the United States is:

1. A process for formation of a polyphenylene oxide having the formula

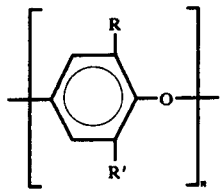

where R and R' are lower primary alkyl and $n$ is a number representing the average degree of polymerization and is at least 100 which comprises:
   oxidatively coupling the corresponding monohydric phenol with an oxygen-containing gas under polymer-forming reaction conditions in a liquid reaction mixture which is essentially free of ammonium ion and in which the phenol is soluble in the presence of a copper-amine complex soluble in the reaction mixture comprising
   a. copper ion
   b. bromide ion
   c. a diamine having the formula

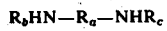

where $R_a$ is $C_{2-4}$-alkylene or $C_{3-7}$-cycloalkylene and $R_b$ and $R_c$ are isopropyl or $C_{4-8}$-tertiary alkyl, including cycloalkyl, in which only the α-carbon atom has no hydrogens, there being at least two and no more than three carbon atoms separating the two nitrogen atoms
   d. a tertiary amine which is N-methylpyrrolidine, triethylenediamine or a trialkylamine wherein at least two of the alkyl groups are methyl and the third is $C_{1-8}$ primary or $C_{3-8}$ secondary alkyl,
      wherein, the molar ratio of (b) to (a) is at least 2, the molar ratio of (c) to (a) is at least 1 and the ratio of equivalents of (d) to moles of (a) is at least 6.
2. The process of claim 1, wherein the reaction is carried out in the presence of benzene, chlorobenzene or toluene, containing up to 250% methanol by weight based on the monohydric phenol.
3. The process of claim 1, wherein the molar ratio of the monohydric phenol to the copper ion is at least 500.
4. The process of claim 1, wherein $R_a$ is ethylene or propylene, $R_b$ and $R_c$ have from 3 to 5 carbon atoms, and the tertiary monoamine is a $C_{1-4}$-alkyldimethylamine.
5. The process of claim 4, wherein $R_a$ is ethylene and $R_b$ and $R_c$ are each tert-butyl.
6. The process of claim 5, wherein the ratio of (b) to (a) is at least 4 and the ratio of (d) to (a) is at least 9 and the molar ratio of the monohydricphenol to copper ion is at least 700.
7. The process of claim 2, wherein R and R' are each methyl, $R_a$ is ethylene, $R_b$ and $R_c$ are each tertiary butyl and the tertiary monoamine is trimethylamine.
8. The process of claim 7, wherein the ratio of (b) to (a) is at least 3 and the ratio of (d) to (a) is at least 9.
9. The process of claim 8, wherein toluene is used as the solvent.
10. The process of claim 2, wherein R and R' are each methyl, $R_a$ is ethylene, $R_b$ and $R_c$ are each tertiary butyl and the tertiary monoamine is n-butyldimethylamine.
11. The process of claim 10, wherein the ratio of (b) to (a) is at least 3 and the ratio of (d) to (a) is at least 9.
12. The process of claim 11, wherein toluene is used as the solvent.
13. The process of claim 2, wherein R and R' are each methyl, the molar ratio of the monomeric phenol to copper ion is at least 700, the ratio of (b) to (a) is at least 4 and the ratio of (d) to (a) is at least 9.
14. The process of claim 13, wherein the solvent is toluene.
15. The process of claim 1, wherein the reaction is carried out in the presence of a phase transfer agent.
16. The process of claim 15, wherein the reaction is carried out in the substantial absence of a polar hydrolytic solvent.
17. The process of claim 15, wherein the reaction is carried at a temperature within the range of from about 15° C. to about 60° C., at a monomer to solvent ratio within the range of from about 15:85 to about 30:70, and in the presence of a lower alkanol or glycol.
18. The process of claim 17, wherein the phase transfer agent is selected from quaternary ammonium, phosphonium or tertiary sulfonium compounds or mixtures thereof, and the mole equivalent ratio of phase transfer agent per atom of copper is at least about 0.1:1.

19. The process of claim 18, wherein the mole equivalent ratio of phase transfer agent per atom of copper is at least about 0.25:1.

20. The process of claim 19, wherein the phase transfer agent is tricaprlylylmethyl ammonium chloride.

21. The process of claim 15, wherein the reaction is carried out in the absence of a polar hydrolytic solvent at a temperature within the range of from about 15° C. to about 60° C., and the mole equivalent ratio of phase transfer agent per atom of copper is at least about 1:1.

22. The process of claim 21, wherein the phase transfer agent is selected from quaternary ammonium, phosphonium or tertiary sulfonium compounds, or mixtures thereof.

23. The process of claim 22, wherein the phase transfer agent is tricaprlylylmethyl ammonium chloride.

* * * * *